(12) United States Patent
Gauthier

(10) Patent No.: US 9,836,776 B2
(45) Date of Patent: Dec. 5, 2017

(54) GENERATION AND SEARCH OF MULTIDIMENSIONAL LINKED LISTS AND COMPUTING ARRAY

(71) Applicant: Alain Gauthier, Montreal (CA)

(72) Inventor: Alain Gauthier, Montreal (CA)

(73) Assignee: SAP SE, Walldorf (DE)

( * ) Notice: Subject to any disclaimer, the term of this patent is extended or adjusted under 35 U.S.C. 154(b) by 467 days.

(21) Appl. No.: 14/512,968

(22) Filed: Oct. 13, 2014

(65) Prior Publication Data

US 2016/0104227 A1    Apr. 14, 2016

(51) Int. Cl.
G06Q 30/00     (2012.01)
G06Q 30/06     (2012.01)
G06F 17/30     (2006.01)

(52) U.S. Cl.
CPC ... *G06Q 30/0625* (2013.01); *G06F 17/30424* (2013.01); *G06F 17/30958* (2013.01)

(58) Field of Classification Search
None
See application file for complete search history.

(56) References Cited

U.S. PATENT DOCUMENTS 5,359,724 A  * 10/1994 Earle ................... G06F 12/0207
5,950,191 A  *  9/1999 Schwartz .......... G06F 17/30958
                                                707/758
6,081,804 A     6/2000 Smith
6,839,719 B2 *  1/2005 Wallace ............ G06F 17/30398
                                                345/4
8,473,341 B1 *  6/2013 Walker ............... G06Q 30/0207
                                                705/14.1
8,700,638 B2 *  4/2014 Dearman .......... G06F 17/30961
                                                707/692
8,838,650 B2 *  9/2014 Fei ..................... G06F 17/30864
                                                707/797
2003/0097357 A1* 5/2003 Ferrari ............. G06F 17/30864
2009/0276404 A1* 11/2009 Henigman .............. G06F 17/30
2012/0179699 A1* 7/2012 Ward ................ G06F 17/30589
                                                707/754

(Continued)

OTHER PUBLICATIONS

"The Great Tree-List Recursion Problem" (Article #109 in the Stanford CS Education library http://cslibrary.stanford.edu/109/TreeListRecursion.pdf by Nick Parlante, 2000) ("Parlante").*

(Continued)

*Primary Examiner* — Naeem Haq
*Assistant Examiner* — Norman Sutch, Jr.
(74) *Attorney, Agent, or Firm* — Mintz Levin Cohn Ferris Glovsky and Popeo, P.C.

(57) ABSTRACT

A computing server is described that can transform hierarchical data structures (for example, tree structures, which are also referred to as trees) storing data into multidimensional linked lists and an in-memory computing array (also referred to herein as a computing array). The computing array can include pointers to nodes of the multidimensional linked lists. The storage of data in the form of multidimensional linked lists and computing arrays can enable the computing server to quickly retrieve data values from the data stored in the hierarchical data structures without parsing the hierarchical data structures. Related apparatuses, systems, techniques, and articles are also described.

18 Claims, 9 Drawing Sheets

(56) References Cited

U.S. PATENT DOCUMENTS

2012/0265776 A1* 10/2012 Wang ............... G06F 17/30958
707/758

OTHER PUBLICATIONS

"Linked List Problems" (http://touque.ca/EC/ICS4U/resources/LinkedListProblems.pdf by Nick Parlante, 2001).*
"Peeling Back the ORM: Demystifying Relational Databases for New Web Developers"(https://blog.hartleybrody.com/databases-intro/ by Hartley Brody, Nov. 19, 2013).*
D. E. Knuth, J. H. Morris, and V. R. Pratt, "Fast pattern matching in strings", SIAM Journal of Computing, 6(2): 323-350, 1977.

* cited by examiner

| FIRST IDENTIFIER (FOR EXAMPLE, ACCOUNT) 206 | SECOND IDENTIFIER (FOR EXAMPLE, PRODUCT) 208 | FIRST VALUE (FOR EXAMPLE, RATE) 204 |
|---|---|---|
| A2  206a | P3  208b | 0.5 |
| A4  206c | P7  208c | 0.2 |
| A3  206b | P2  208a | 0.3 |
| A2  206a | P2  208a | 0.4 |
| A4  206c | P2  208a | 0.1 |
| ... | ... | ... |

GENERATION AND SEARCH OF MULTIDIMENSIONAL LINKED LISTS AND COMPUTING ARRAY

TECHNICAL FIELD

In some implementations, the subject matter described herein generally relates to data processing, and in particular, to conversion of a hierarchical data structure including data into multidimensional linked lists and a computing array including pointers to nodes of multidimensional linked lists for retrieval of the data.

BACKGROUND

Manufacturers usually sell products to various retailers at different prices. Some of these manufacturers manufacture a large number (for example, hundreds, thousands, or more) of products, and have numerous (for example, hundreds, thousands, or more) of retailers as their customers to whom they sell the products. In one example, a chocolate company may sell their chocolates to various retailers. Typically, such companies (for example, the chocolate company) desire selling each product (for example, a particular chocolate) to different retailers at different prices. The manufacturer thus needs to determine prices that the manufacturer should charge for each product (for example, each type/brand of chocolate) when sold to each eligible retailer. Authorized personnel at the manufacturer manually determine these prices. However, as the number of products and/or retailers becomes large (for example, ten or more), such manual determining of prices can consume a significant amount of time and can be labor intensive.

In some conventional implementations, all data associated with the products and retailers is traditionally stored in large computing arrays, and retrieved by searching the computing arrays. However, this storage in the computing arrays is inefficient, and occupies a lot of space in the memory while leaving some space unusable. Moreover, searching these computing arrays takes a lot of time.

To cure some of the deficiencies of storing data in large computing arrays, some other traditional implementations store data (for example, products and retailers) in hierarchical tree structures. To parse such hierarchical tree structures, a search process implements a conventional tree parsing algorithm to search for the desired data. However, to search for the data in the hierarchical tree structures, the tree parsing algorithm parses through each and every node of the hierarchical tree structures, which can be inefficient and significantly time consuming. Moreover, when there are multiple hierarchical tree structures to be parsed in order to find the search result, the search process becomes slower with each additional hierarchical tree structure.

Accordingly, there exists a need for generating data structures that enable a prompt retrieval of data stored in hierarchical structures while avoiding the use of time-consuming conventional tree parsing algorithms.

SUMMARY

The current subject matter describes a computing server that transforms hierarchical data structures (for example, tree structures, which are also referred to as trees) storing data into multidimensional linked lists and an in-memory computing array (also referred to herein as a computing array). The computing array can include pointers to nodes of the multidimensional linked lists. The storage of data in the form of multidimensional linked lists and computing arrays can enable the computing server to quickly retrieve data values from within the data stored in the hierarchical data structures without parsing the hierarchical data structures. Related apparatuses, systems, techniques, and articles are also described.

In one aspect, one or more data processors in a computing server can retrieve a plurality of hierarchical data structures from a database in response to a request for a data value. The plurality of hierarchical data structures can include a plurality of nodes characterizing data stored within a plurality of tables. The one or more data processors can use the plurality of hierarchical data structures to generate a plurality of linked lists. Each linked list in the plurality of linked lists can be associated with a corresponding leaf node in the plurality of nodes. Although a leaf node is described, in other implementations, each linked list can be associated with any other corresponding node. The one or more data processors can generate a computing array that can store pointers to locations of each leaf node (or any other node, as in other implementations mentioned above) associated with each linked list in the plurality of linked lists. The computing server can search the computing array and the plurality of linked lists to obtain a search result to determine the data value.

In some variations, one or more of the following can be implemented either individually or in any feasible combination. The computing server can receive the request (for example, from a computing device) for the data value. The computing server can transmit (for example, to the computing device) the data value in response to the request for the data value. The plurality of tables can include a first table and a second table. The first table can include a first plurality of first identifiers, a first plurality of second identifiers, and a plurality of first values. The second table can include a second plurality of the first identifiers, a second plurality of the second identifiers, and a plurality of second values.

At least one first identifier in the plurality of first identifiers can include at least one product in a plurality of products. At least one second identifier in the plurality of second identifiers can include at least one retailer in a plurality of retailers. At least one first value in the plurality of first values can include a rate for at least one product in the plurality of products and for at least one retailer in the plurality of retailers. The rate can represent a numerical value generated based on data characterizing historical transactions. At least one second value in the plurality of second values can include an estimate for at least one product in the plurality of products and for at least one retailer in the plurality of retailers. The estimate can represent another numerical value generated based on a market analysis. The data value can be a price that should be charged for each product from each retailer. The price can be determined based on the rate and the estimate. Although rate and estimate are described herein as examples of the identifiers, in alternate implementations, any other identifier that characterizes a dimension can be added to the plurality of tables.

The plurality of hierarchical data structures can include a first tree (which can also be referred to as a first tree structure) and a second tree (which can also be referred to as a second tree structure). The first tree can include the plurality of first identifiers arranged in a first hierarchical order. The second tree can include the plurality of second identifiers arranged in a second hierarchical order. The plurality of linked lists can include a plurality of multidimensional linked lists having data arranged according to a plurality of dimensions. The plurality of linked lists can include a plurality of multidimensional linked lists. Each multidimensional linked list can have data arranged according to a plurality of dimensions including a first dimension associated with the plurality of first identifiers and a second dimension associated with the plurality of second identifiers.

The plurality of linked lists can include a first linked list and a second linked list. The determining of the search result can include determining a closest ancestor match (which can also be referred to as a closest hierarchy ancestor match) in the plurality of linked lists. The closest ancestor match can characterize an ancestor node in the first linked list having a first value equal to the first value of another ancestor node in the second linked list. The first value can be the search result that is used to calculate the data value.

In another aspect, a non-transitory computer program product is described that can store instructions that, when executed by at least one programmable processor, can cause the at least one programmable processor to perform the following operations. The at least one programmable processor can send data characterizing a request for values of data to a computing server. The computing server can retrieve a plurality of hierarchical data structures from a database connected to the computing server. The plurality of hierarchical data structures can include a plurality of nodes characterizing data within with a plurality of tables. The computing server can generate a plurality of linked lists by using the plurality of hierarchical data structures. The computing server can generate a computing array storing pointers to locations of the plurality of nodes of the linked lists. The computing server can search the computing array and the plurality of linked lists to determine search results that can be used to determine the values of data. The at least one programmable processor can receive the values of data from the computing server. The at least one programmable processor can output the values of data. In one example, the at least one programmable processor can be a processor of a computing device that can be used by an entity.

In some variations, one or more of the following can be implemented either individually or in any feasible combination. The outputting of the values of data by the at least one programmable processor can include displaying the values of data on a graphical user interface executed by or connected to the at least one programmable processor.

In yet another aspect, a system is described that has a computing device and a computing server connected to the computing device via a communication network. The computing server can include at least one programmable processor and a memory storage. The computing device can receive data characterizing a request for values of data from the computing device. The computing server can retrieve a plurality of hierarchical data structures from a database connected to the computing server and in response to the receiving of the data characterizing the request. The computing server can use the hierarchical data structures to generate a plurality of linked lists. The computing server can store pointers to locations of one or more nodes within the plurality of linked lists in a computing array. The computing server can search the computing array and the plurality of linked lists to obtain search results that are used to determine the values of data. The computing server can send the values of data to the computing device.

In some variations, one or more of the following can be implemented either individually or in any feasible combination. The computing device can include a user interface device that can execute a graphical user interface to display the values of data. The memory storage of the computing server can store the computing array and the plurality of linked lists. The plurality of hierarchical data structures can include a plurality of nodes characterizing data within with a plurality of tables. The plurality of tables can include a first table and a second table. The first table can include a first portion of a plurality of first identifiers, a first portion of a plurality of second identifiers, and a plurality of first values. The second table can include a second portion of the plurality of first identifiers, a second portion of the plurality of second identifiers, and a plurality of second values.

The first portion of the plurality of first identifiers can include a first set of one or more products in a plurality of products. The second portion of the plurality of first identifiers can include a second set of one or more products in the plurality of products. The first portion of the plurality of second identifiers can include a first set of one or more retailers in a plurality of retailers. The second portion of the plurality of second identifiers can include a second set of one or more retailers in a plurality of retailers. At least one first value in the plurality of first values can characterize a rate for at least one product in the first set of one or more products and for at least one retailer in the first set of one or more retailers. The rate can represent a numerical value generated based on data characterizing historical transactions. At least one second value in the plurality of second values can characterize an estimate for at least one product in the second set of one or more products and for at least one retailer in the second set of one or more retailers. The estimate can represent another numerical value generated using a market analysis.

It may be noted that all the data in each table can have a cascading (that is, downwards) inheritance. Therefore, each product and each retailer has a value even if this value is not in the tables. For example, if value of a product X is absent in the tables of rate and estimate, product X inherits by default the value of a closest hierarchy ancestor of the product X. This is also why the hierarchy format is important at the database level.

The values of data can be a plurality of prices that should be charged for products from corresponding retailers. At least one price in the plurality of prices can be generated by multiplying the rate with the estimate. The plurality of hierarchical data structures can include: a first hierarchical data structure that can include the plurality of first identifiers arranged in a first hierarchical order, and a second hierarchical data structure that can include the plurality of second identifiers arranged in a second hierarchical order.

The plurality of linked lists can include a plurality of multidimensional linked lists having data arranged according to a plurality of dimensions. The plurality of linked lists can include a first linked list and a second linked list. The determining of the search results can include determining a closest ancestor match in the plurality of linked lists. The closest ancestor match can characterize an ancestor node in the first linked list having a first value equal to the first value of another ancestor node in the second linked list. The first value can be the search result that is used to calculate at least one value of data.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the computing server can store a large amount of data present in hierarchical data structures (for example, tree structures, which are also referred to as trees) in the form of multidimensional linked lists and a computing array storing pointers to nodes of the multidimensional linked lists. Such storage enables a search of required data within the data stored in the hierarchical data structures in an amount of time less than that taken by a conventional tree parsing algorithm to recursively climb the hierarchical data structure, thereby providing faster search results to an entity seeking those search results.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 2 illustrates a first table that includes a first value associated with a first identifier and a second identifier, according to some implementations of the current subject matter;

When practical, like reference symbols in the various drawings indicate like elements.

DETAILED DESCRIPTION

Figure 1:
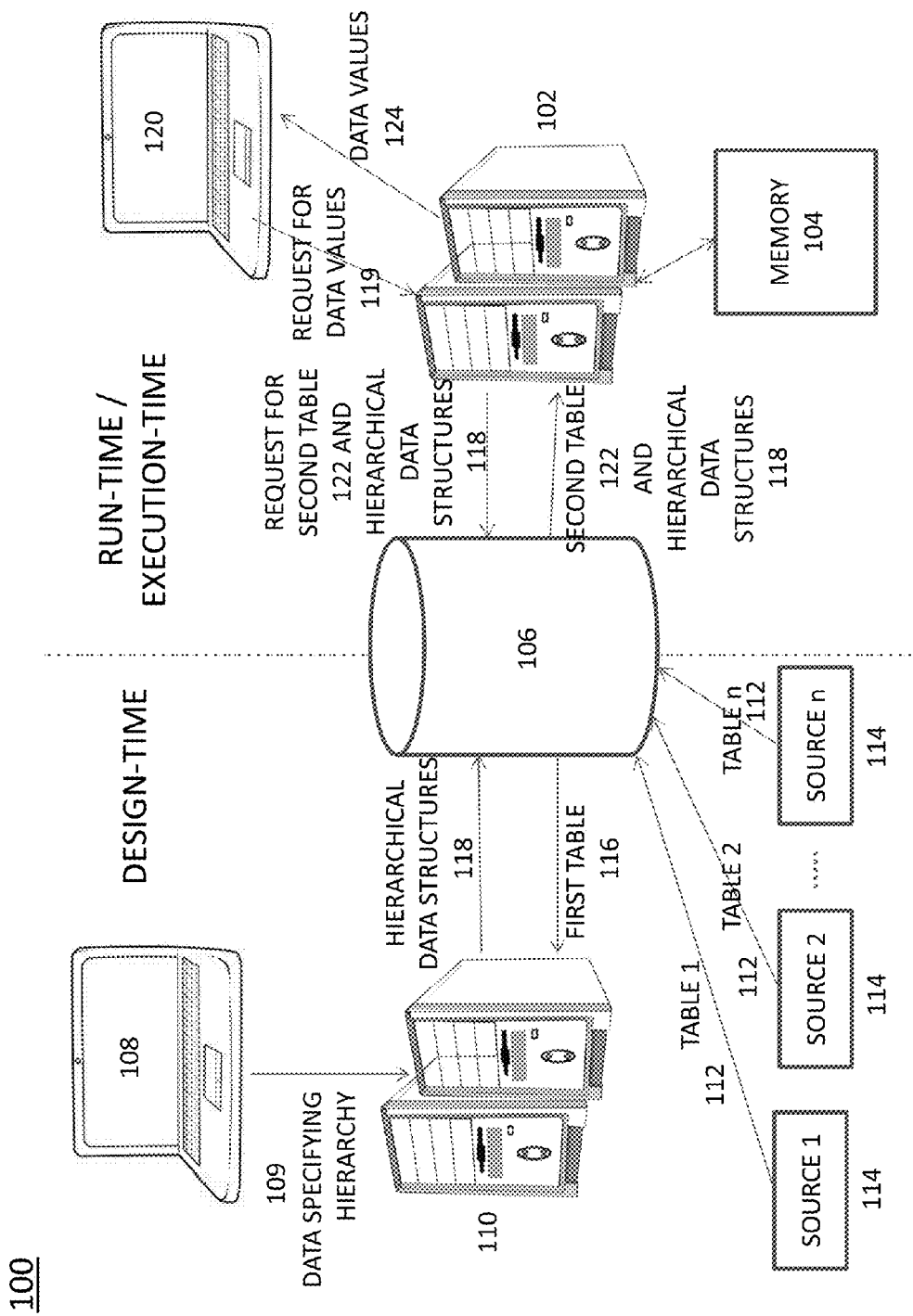
FIG. 1 illustrates an exemplary system that can include a computing server that can convert hierarchical data structures storing data into multidimensional linked lists and an in-memory computing array (also referred herein as a computing array) including pointers to nodes of the multidimensional linked lists, according to some implementations of the current subject matter.

FIG. 1 illustrates an exemplary system 100 that can include a computing server 102 that can convert hierarchical data structures (for example, tree structures, which can also be referred to as trees) storing data (for example, product and pricing data of an entity such as a manufacturer) into multidimensional linked lists and an in-memory computing array (also referred herein as a computing array) including pointers to nodes of the multidimensional linked lists in the memory (for example, random access memory) 104 of the computing server 102, according to some implementations of the current subject matter. Storage of data in such multidimensional linked lists enables the computing server 102 to speedily search for search results from data stored within the hierarchical data structures and send the search results to a computing device of an entity in response to a search request. Besides the computing server 102 and the memory 104, the system 100 can further include the following components: a database 106, a computing device 108, a hierarchical data structure generator 110 (which can be a computing device with at least one programmable processor and a memory for storing data), sources (for example, computing devices) 114 for tables, and another computing device 120. These components are discussed in further detail below.

In design-time, a database 106 containing tables and hierarchical data structures (for example, tree structures that can store data within tree nodes or nodes that are arranged hierarchically) associated with a particular table can be generated. The design time can refer to a time period when the database 106 can be generated. This generation of the database 106 is described as follows. A computing device 108 configured to be operated by an authorized user at an entity can receive data 109 specifying a hierarchy for hierarchical data structures (for example, an first identifier hierarchical data structure 402 and a second identifier hierarchical data structure 502, which are described in more detail below by FIGS. 4 and 5) that are to be generated. The computing device 108 can send this data 109 specifying the hierarchy to the hierarchical data structure generator 110. The database 106 can receive a plurality of tables 112 (for example, a first table 202 and a second table 302, which are described in more detail below by FIGS. 2 and 3) from a plurality of corresponding sources 114. The hierarchical data structure generator 110 can retrieve a first table 116 (for example, the first table 202, which is described in more detail below by FIG. 2) in the plurality of tables 112 from the database 106. The hierarchical data structure generator 110 can then generate hierarchical data structures 118 (for example, first identifier hierarchical data structure 402 and second identifier hierarchical data structure 502, which are described in more detail below by FIGS. 4 and 5) associated with the first table 116 based on the first table 116 and the data 109 specifying the hierarchy for these hierarchical data structures 118. The hierarchical data structure generator 110 can then send the hierarchical data structures 118 for storage in the database 106 along with the tables 112.

In some implementations, the design-time may not correspond to real-time. That is, the hierarchical data structure generator 110 may not necessarily generate the hierarchical data structures 118 immediately after the database 106 receives tables 112 from sources 114 and the hierarchical data structure generator 110 receives data 109 specifying the hierarchy for hierarchical data structures 118 from the computing device 108. In alternate implementations, the design-time can correspond to real-time. That is, the hierarchical data structure generator 110 can generate the hierarchical data structures 118 immediately after the data 109 database 106 receives tables 112 from sources 114 and the hierarchical data structure generator 110 receives data 109 specifying the hierarchy for hierarchical data structures 118 from the computing device 108.

In run-time, the computing server 102 can use the database 106, which has already been generated in design-time, to determine search results in response to a search request from the computing device 120. The run-time can also be referred to as execution time. The run-time can correspond to real-time. That is, the computing server 102 computing server can determine search results immediately after receiving the search request. A description of this determining of the search results follows.

As noted above, the computing server 102 can receive a search request 119 for specific data from the computing device 120 of the entity. In one example, the search request 119 can seek values that can include a list of prices of various products for each account, wherein an account can be a customer of the entity, such as a retailer selling products of the entity. In some implementations, the computing device 120 can be different from the computing device 108, and both these computing devices 108 and 120 can be operated by separate users. In another implementation, the computing device 120 can be same as the computing device 108. In response to the search request 119, the computing server 102 can request the database 106 for a second table 122 (for example, the second table 302, which is described below in more detail by FIG. 3) and the hierarchical data structures 118 (for example, the first identifier hierarchical data structure 402 and the second identifier hierarchical data structure 502, which are described in more detail below by FIGS. 4 and 5). The computing server 102 can then receive the second table 122 and the hierarchical data structures 118 from the database 106. The computing server 102 can generate multidimensional linked lists (for example, linked lists 602 and 702, which are described below by FIGS. 6 and 7) associated with nodes identified in the second table 122, wherein nodes identified in the second table 122 can be starting nodes of respective linked lists. The computing server 102 can generate a computing array (for example, computing array 802 described in more detail below by FIG. 8) that can store pointers to leaf nodes (or other nodes as well besides the leaf nodes in other implementations). The generation of the multidimensional linked lists and the computing array is described in more detail below by FIGS. 6 and 7. The computing server 102 can store the multidimensional linked lists and the computing array in the memory 104.

The computing server 102 can then perform the search for the values 124 for the specific data requested by the computing device 120 within the memory 104 (as described in further detail below by FIG. 9). This search can be significantly fast as compared to conventional searches, as the search of required data within a multidimensional linked list including pointers always uses the shortest search path to the required data. Also, it is well established that pointer navigation is faster than traditional recursive tree parsing. Moreover, the multidimensional linked lists can store results associated with multiple dimensions, thereby enabling the computing server 102 to search for data within those multidimensional linked lists rather than searching for data by parsing the hierarchical data structures. The computing server 102 can then send the searched values 124 of the specific data to the computing device 120, which can then store and/or output (for example, display on a graphical user interface executed by the computing device 120) the values 124. The values 124 can include a list of prices of various products for each account, wherein an account can be a customer of the entity, such as a retailer selling products of the entity.

As discussed in more detail below, a search result (for example, a price of a particular product when sold to a specific corresponding entity) is not a value that is simply read from pre-existing tables (for example, price tables) and there are no such pre-existing tables (for example, price tables); instead, the search result (for example, price) is computed by multiplying results obtained by multiplying a first value (for example, rate) with a second value (for example, estimate) stored at many different levels in multiple hierarchical data structures. This is also why replacing a conventional recursive tree parsing algorithm (which may require to parse many trees to get the first value and many trees to get the second value in order to finally generate the search result by running the computation {first value*second value} to obtain a price) with a linked list can be advantageous.

The computing server 102 can be a server system that includes at least one programmable processor and a memory. In an alternate implementation, the memory 104 can be connected to the computing server 102 via a communication network. The database 106 can be connected to the computing server 102 via a communication network. The database 106 can be either a part (for example, memory storage) within the hierarchical data structure generator 110 or be connected to the hierarchical data structure generator 110 via a communication network. The computing device 120 of the entity can be connected to the computing server 102 via a communication network. The computing device 108 of the entity can be connected to the hierarchical data structure generator 110 via a communication network. The sources 114 can be connected to the database 106 via a communication network. The communication networks described herein can be one or more of: a local area network, a wide area network, internet, intranet, BLUETOOTH® network, infrared network, and/or other communication networks. Each of the computing device 120 and the computing device 108 can be one of: a laptop computer, a desktop computer, a tablet computer, a cellular smart phone, a phablet, and/or any other computing device.

FIG. 2 illustrates a first table 202 that includes a first value 204 associated with a first identifier 206 and a second identifier 208, according to some implementations of the current subject matter. The first identifier 206 can have values 206a, 206b, 206c, and so on. The second identifier 208 can have values 208a, 208b, 208c, and so on. In one example, the first identifier can identify an account of an entity (for example, a retailer that is a customer of the entity), the second identifier can identify a product provided (for example, sold or distributed) by the entity, and the first value 204 can be a rate for each product provided by the entity to each account. The first table 116 (as described by FIG. 1) can be the first table 202. The first table 202 can be obtained from a source 114, which can be the entity or any other individual or institution. This source 114 can generate the first values 204 (for example, rates) based on historical transaction data that can include data characterizing a large number of historical transactions.

Figure 3:
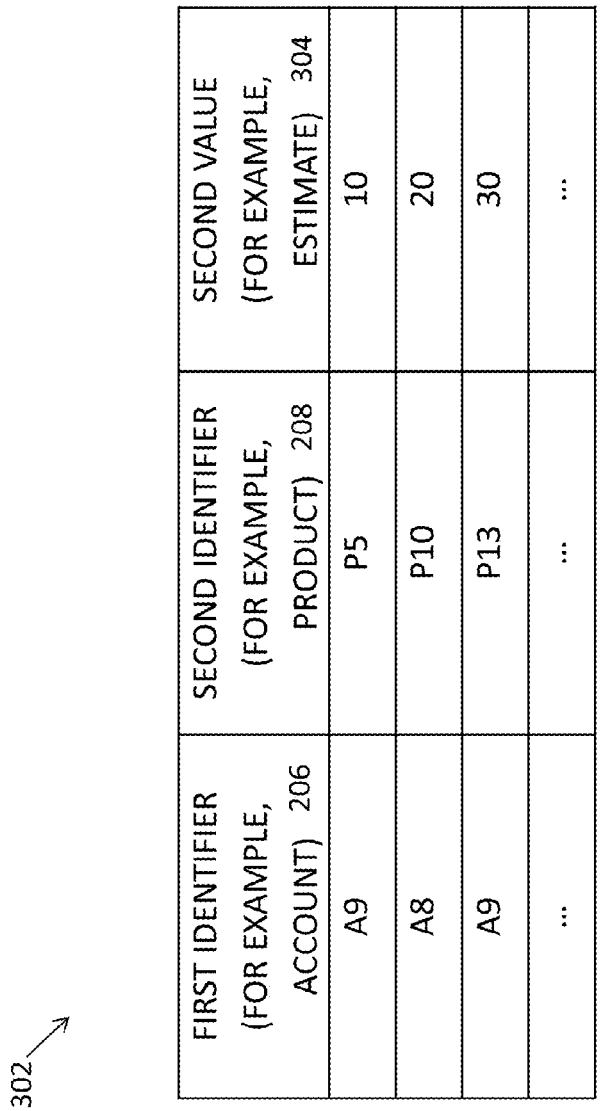
FIG. 3 illustrates a second table 302 that includes a second value 304 associated with the first identifier 206 and the second identifier 208, according to some implementations of the current subject matter.

FIG. 3 illustrates a second table 302 that includes a second value 304 associated with the first identifier 206 and the second identifier 208, according to some implementations of the current subject matter. In one example, the second value 304 can be a prediction of a numerical value (which can also be referred to as an estimate) to which the first value 204 (for example, the rate) is multiplied to generate the values 124 (as shown by FIG. 1, and for example, the price for a particular product when provided to a specific account of the entity). The second table 302 can be one of the tables 112. The second table 202 can be obtained from a source 114, which can be an individual or institution other than the entity. This source 114 can generate the second values 304 (for example, estimates) by performing a market analysis on a generic historical sales and marketing data in the market.

Figure 4:
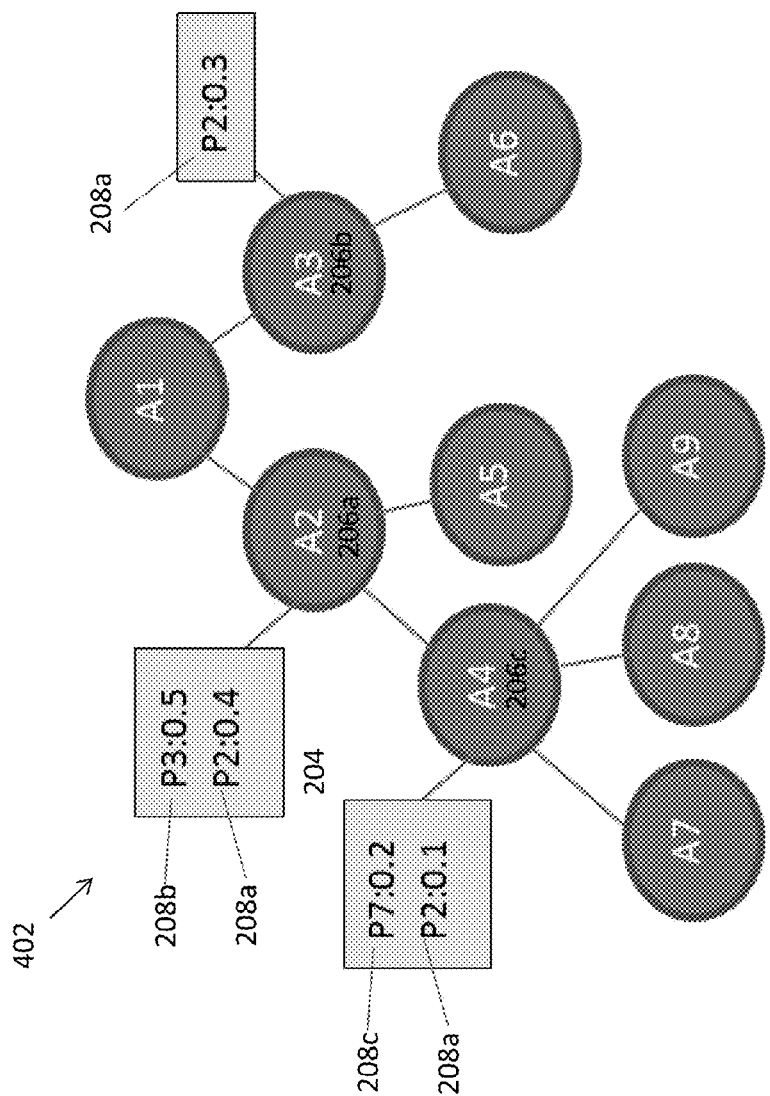
FIG. 4 illustrates an exemplary first identifier hierarchical data structure that represents the first values associated with one or more first identifiers and one or more second identifiers, according to some implementations of the current subject matter.

FIG. 4 illustrates an exemplary first identifier hierarchical data structure 402 that represents the first values 204 associated with one or more first identifiers 206 and one or more second identifiers 208, according to some implementations of the current subject matter. The hierarchical data structure generator 110 (as shown in FIG. 1) can use the hierarchy data 109 (as shown in FIG. 1) in design-time to hierarchically arrange the first identifiers 206. The hierarchical data structure generator 110 can use the first table 202 in design-time to associate the first identifiers 206a, 206b, 206c, and so on with (i) corresponding second identifiers 208a, 208b, 208c, and so on, and (ii) first value 204 associated with each pair of first identifier and associated second identifier. In one example, the first identifier hierarchical data structure 402 can include rates for one or more products provided to one or more accounts 208 in a plurality of accounts that are arranged hierarchically. Hierarchical arrangement of data advantageously allows nodes of the hierarchical data structure to inherit data of their respective parent nodes.

Figure 5:
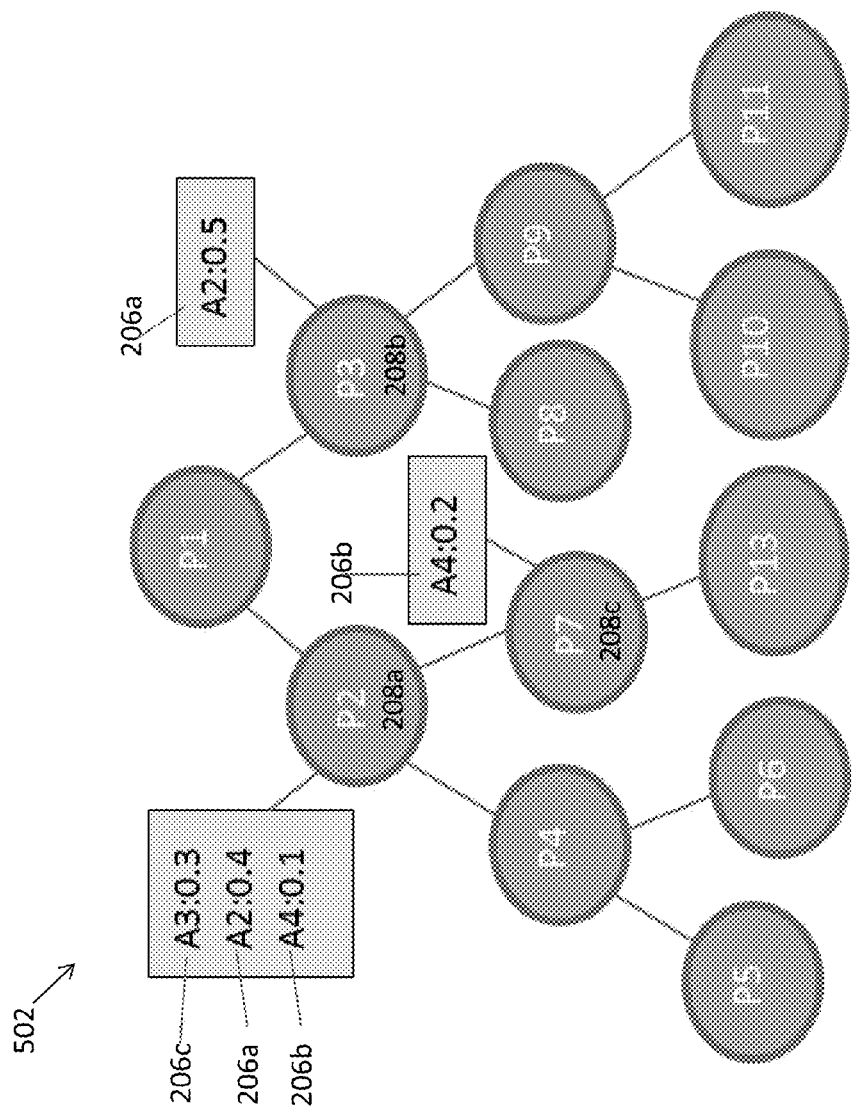
FIG. 5 illustrates an exemplary second identifier hierarchical data structure that represents the first values associated with one or more first identifiers and one or more second identifiers, according to some implementations of the current subject matter.

FIG. 5 illustrates an exemplary second identifier hierarchical data structure 502 that represents the first values 204 associated with one or more first identifiers 206 and one or more second identifiers 208, according to some implementations of the current subject matter. The hierarchical data structure generator 110 (as shown in FIG. 1) can use the hierarchy data 109 (as shown in FIG. 1) in design-time to hierarchically arrange the second identifiers 206. The hierarchical data structure generator 110 can use the first table 202 in design-time to associate the second identifiers 208a, 208b, 208c, and so on with (i) corresponding first identifiers 206a, 206b, 206c, and so on, and (ii) first value 204 associated with each pair of first identifier 206 and associated second identifier 208. In one example, the second identifier hierarchical data structure 502 can represent the rates 204 provided to one or more accounts 208 for one or more products 206 provided to those one or more accounts 208. These one or more products 206 can be a part of a plurality of products that are arranged hierarchically. Hierarchical arrangement of data advantageously allows nodes of the hierarchical data structure to inherit data of their respective parent nodes.

Figure 6:
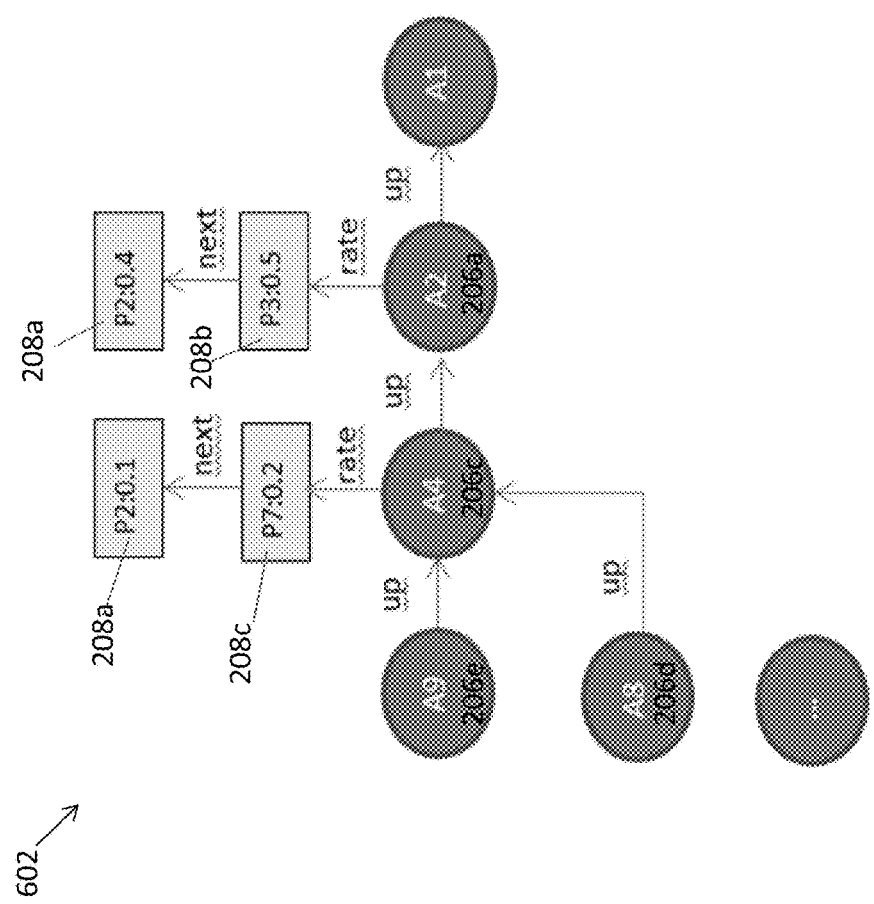
FIG. 6 illustrates an exemplary multidimensional linked list representing the shortest path to value from an exemplary starting point at the leaf node of the first identifier hierarchical data structure, according to some implementations of the current subject matter.

FIG. 6 illustrates an exemplary multidimensional linked list 602 representing the shortest path to value from an exemplary starting point at the leaf node of the first identifier hierarchical data structure 402, according to some implementations of the current subject matter. In the example shown, the multidimensional linked list 602 can be generated for leaf nodes A7, A8, and A9 of the first identifier hierarchical data structure 402. A leaf node of a hierarchical data structure is defined as an end node that does not have any child node, but can have one or more parent nodes. The leaf node can also be referred to as a terminal node. The computing server 102 can generate the multidimensional linked list 602 for the node A9, which is also identified in the second table 302 (as shown by FIG. 3). As leaf nodes A8 and A7 (which may also be identified in the second table 302) have same subsequent nodes (that is, A4, A2, and A1) in the first identifier hierarchical data structure 402, and hence, similar multidimensional linked lists as for node A9, the multidimensional linked lists for nodes A7, A8, and A9 can be combined to form the single multidimensional linked list 602 in order to save memory space and expedite the search process. The computing server 102 can generate a multidimensional linked list similar to the multidimensional linked list 602 for other leaf nodes (for example, A5, A6, and/or any other leaf nodes in the first identifier hierarchical data structure 402), wherein multidimensional linked lists for nodes with same subsequent nodes can be combined, as in the multidimensional linked list 602.

To generate the multidimensional linked list 602 for nodes A7, A8, and A9, the computing server 102 can first list all the parent nodes (that is, A4, A2, and A1) along with the nodes A7, A8, and A9. For each node first identifier 206 (for example, A4 and A2) that has associated second identifier values (that is, P7 and P2) and first values 204 (that is, 0.2 for P7, and 0.1 for P2), the computing server 102 can generate another linked list based on the hierarchy of the second identifier hierarchical data structure 502. For example, for node A4, associated second identifiers 208 are P2 and P7, which are arranged hierarchically in the second identifier hierarchical data structure 502. The computing server 102 can hierarchically arrange these second identifiers P2 and P7 and their associated first values 204 (that is, 0.2 for P7, and 0.1 for P2) to form another dimension of the multidimensional linked list 602. This another dimension can characterize a second identifier linked list attached to a corresponding node of a first identifier linked list, which represents the first dimension. For this reason, the linked list 602 can be referred to as a multidimensional linked list. The computing server 102 can store the linked list 602 and all other multidimensional linked lists in the memory 104.

Figure 7:
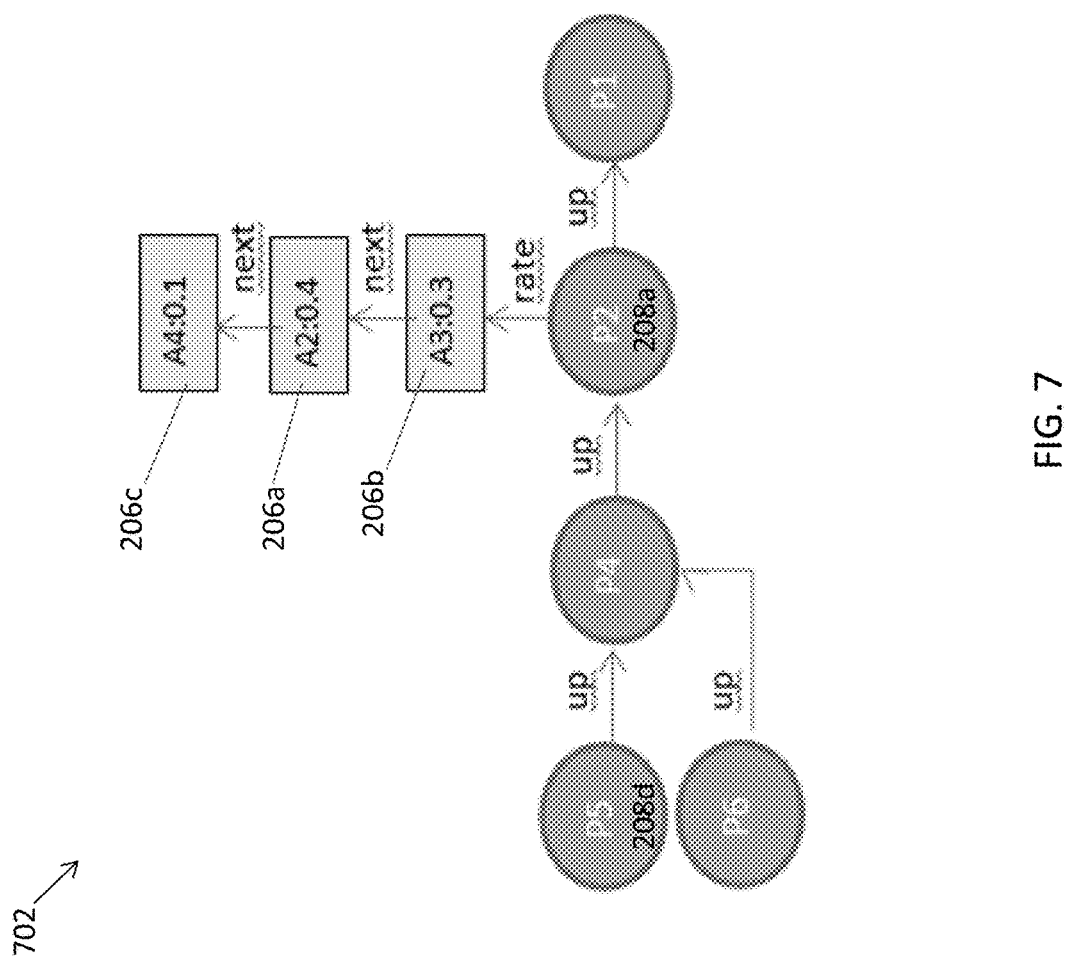
FIG. 7 illustrates an exemplary multidimensional linked list representing the shortest path to value from an exemplary starting point at the leaf node of the second identifier hierarchical data structure, according to some implementations of the current subject matter.

FIG. 7 illustrates an exemplary multidimensional linked list 702 representing the shortest path to value from an exemplary starting point at the leaf node of the second identifier hierarchical data structure 502, according to some implementations of the current subject matter. In the shown example, the multidimensional linked list 702 can be generated for leaf nodes P5 and P6 of the second identifier hierarchical data structure 502. The computing server 102 can generate the multidimensional linked list 702 for the node P5 identified in the second table 302. As leaf node P6 (which may also be identified in the second table 302) have same subsequent nodes (that is, P4, P2, and P1) in the second identifier hierarchical data structure 502, and hence similar multidimensional linked lists as for node P5, the multidimensional linked lists for nodes P5 and P6 can be combined to form the single multidimensional linked list 702 in order to save memory space and expedite the search process. The computing server 102 can generate a multidimensional linked list similar to the multidimensional linked list 702 for other leaf nodes (for example, leaf nodes P13, P10, and P11, and/or other leaf nodes in the second identifier hierarchical data structure 502), wherein multidimensional linked lists for nodes with same subsequent nodes can be combined, as in the multidimensional linked list 702.

To generate the multidimensional linked list 702 for nodes P5 and P6, the computing server 102 can first list all the parent nodes (that is, P4, P2, and P1) along with the nodes P5 and P6. For each second identifier node (for example, P2) that has associated first identifier values (that is, A3, A2, and A4) and rate values (that is, 0.3 for A3, 0.4 for A2, and 0.1 for A4), the computing server 102 can generate another linked list based on hierarchy noted in the second identifier hierarchical data structure 502. For example, for node P2, associated first identifiers 206 are A3, A2, and A4, which can be arranged hierarchically in the first identifier hierarchical data structure 402.

The second dimension linked list within the multidimensional linked list 702, here represented by A3->A2->A4, can connect the node P2 (from hierarchical data structure 502) with all the nodes in hierarchical data structure 402 where there a combination for rate exists, as stored in table 202. That second linked list dimension (A3->A2->A4) does not represent a hierarchy structure; and instead, can simply be a flat list of corresponding node in the other hierarchical data structure for which a rate combination exists. The linked list A3->A2->A4 can also enable the computing server 102 to quickly retrieve search results. FIG. 7 shows A2 placed above A3. The computing server 102 can determine the order of A2 being above A3, as follows. The linked lists can be constructed in memory 104 when loading the data from the hierarchical data structures (for example, trees 402 and 502) stored in the database 106. The order of A2 being above A3 can be determined by the order used for reading the data from the database 106. This reading of the order from the database 106 can be based on how the data is indexed in the database 106 or how the algorithm, that built the linked list, goes through the hierarchical data. In an alternate implementation, the reading of the order from the database 106 can be determined based on a most frequent access criterion. In other implementations, any other way can be used to determine the order of reading the data from the database 106.

The computing server 102 can hierarchically arrange these products P2 and P7 and their associated rates to form another dimension of the multidimensional linked list 702. This another dimension can characterize a first identifier linked list attached to a corresponding node of a second identifier linked list, which represents the first dimension. For this reason, the linked list 702 is referred to as a multidimensional linked list. The computing server 102 can generate, at run-time, and store the linked list 702 and all other multidimensional linked lists in the memory 104.

Here, as there are two dimensions (that is, first identifier 206 and second identifier 208), the computing server 102 can generate two two-dimensional linked lists 602 and 702. In alternate implementations, the number of dimensions can be any number more than two. When there are N dimensions, the computing server 102 can generate N number of N-dimensional linked lists, which are stored in the memory 104.

Figure 8:
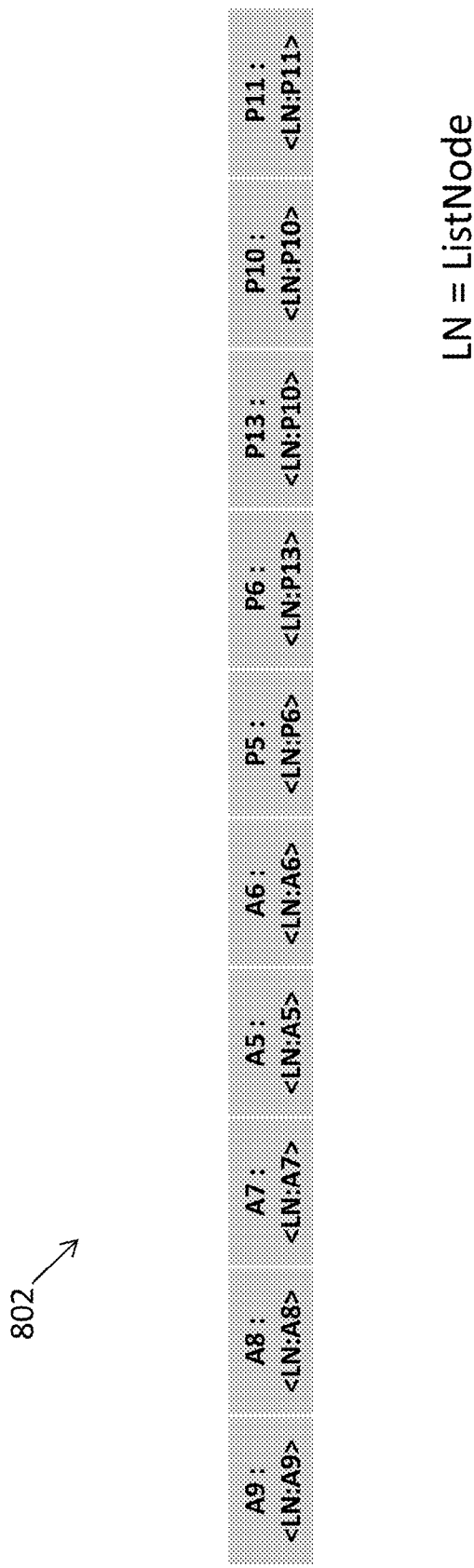
FIG. 8 illustrates an exemplary computing array storing pointers to each first node of each individual linked list, according to some implementations of the current subject matter.

FIG. 8 illustrates an exemplary computing array 802 storing pointers to each first node of each individual multi-dimensional linked list (for example, multidimensional linked lists 602 and 702 and other linked lists associated with nodes A5, A6, P13, P10, and P11), according to some implementations of the current subject matter. In this example, the first node can be a leaf node (for example, A9, A8, A7, A5, A6, P5, P6, P13, P10, and P11) of the hierarchy format of both the first identifier hierarchical data structure 402 and the second identifier hierarchical data structure 502. The computing server 102 can store the computing array 802 in the memory 104. Although the computing array 802 is described as including pointers to only the leaf nodes, in other implementations, a computing array can include pointers to all the nodes in the multidimensional linked lists. The computing server 102 can store (in the memory 104) and use one of these two different types of computing arrays based on requirements of a project where the search is to be performed. The computing array described herein can be defined as an array data structure that includes a plurality of array elements, each of which can be identified by a respective index, which can also be used to retrieve that array element when required.

Figure 9:
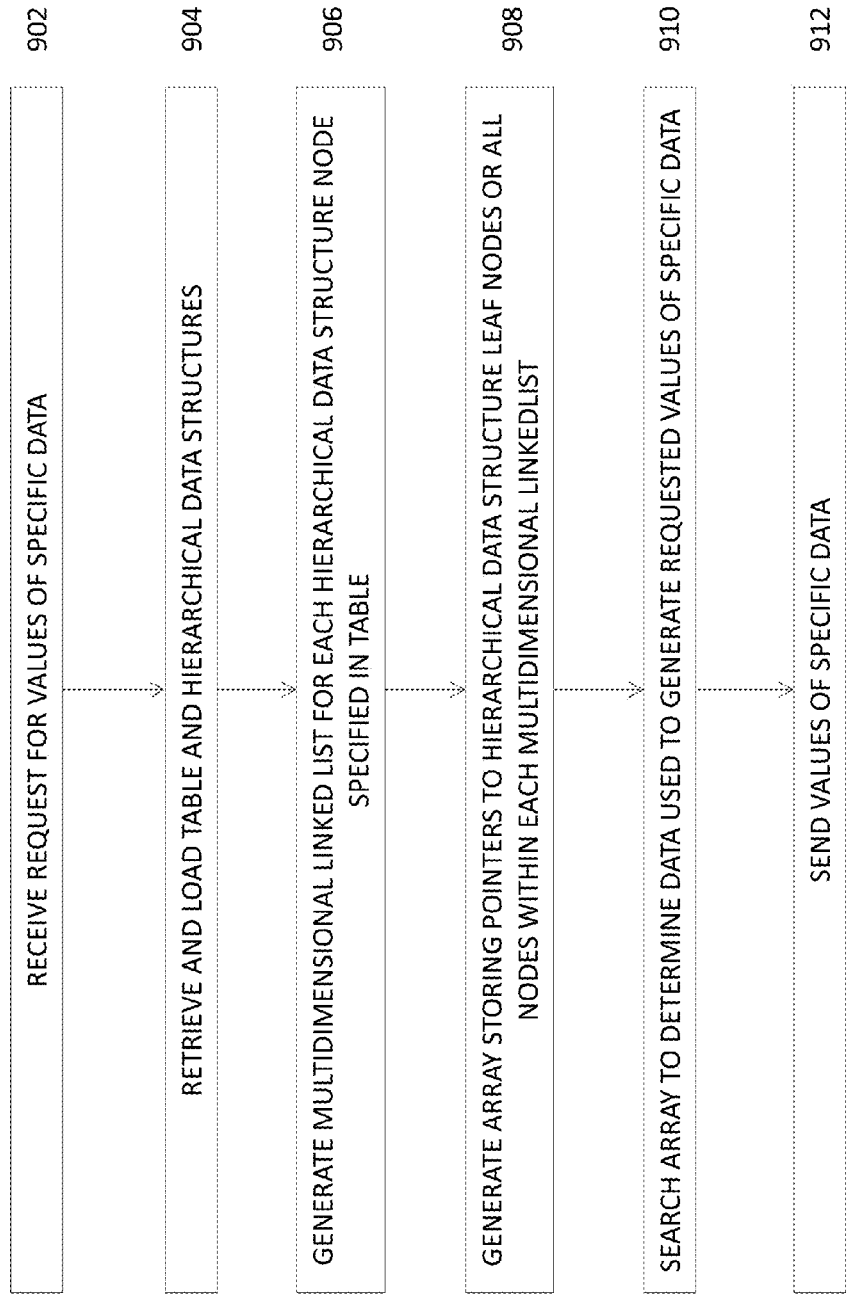
FIG. 9 illustrates an exemplary generation of multidimensional linked lists and a computing array that can enable the computing server to perform a search of data stored in the hierarchical data structure, according to some implementations of the current subject matter.

FIG. 9 illustrates an exemplary generation of multidimensional linked lists (for example, linked lists 602, 702, and other linked lists) and a computing array (for example, the computing array 802) that can enable the computing server 102 to perform a quick search of data stored in the memory 104, according to some implementations of the current subject matter. In one example, such a search can enable an entity to quickly calculate pricing data associated with products of the entity (for example, products manufactured, sold, and/or distributed by the entity) to various accounts of the entity (for example, various retailers selling one or more products to end consumers, wherein these retailers are customers of the entity). For example, the pricing data can be a recommended price of each product for each corresponding account, and this price can be calculated by multiplying a rate 204 with an estimate 304 for this product and account.

The computing server 102 can receive, at 902, data 119 characterizing a request for values 124 of specific data (for example, prices of products to corresponding retailers) from a computing device 120 of the entity. In response to the search request 119, the computing server 102 can retrieve, at 904, a table 122 (for example, the second table 302) and hierarchical data structures 118 (for example, the first identifier hierarchical data structure 402 and the second identifier hierarchical data structure 502) generated using another table 116 (for example, the first table 202) from the database 106. The computing server 904 can load the table 122 and the hierarchical data structures 118 in the memory 104. The computing server 102 can generate, at 906, multidimensional linked lists (for example, linked lists 602, 702, and/or other linked lists) associated with nodes identified in the table 122 (for example, second table 302). The computing server 102 can generate, at 908, a computing array (for example, the computing array 802) storing pointers to leaf nodes (or other nodes as well besides the leaf nodes in other implementations). The computing server 102 can store the multidimensional linked lists and the computing array in the memory 104.

The computing server 102 can search, at 910, the computing array (for example, computing array 802) to determine pointers to nodes of linked lists 602 and 702 in order to determine data (for example, the first value 204 and the second value 304 associated with a particular first identifier (for example, a specific retailer) 206 and a particular second identifier (for example, a specific product) 208) for the values 124 for the specific data requested by the computing device 120 within the memory 104. This search can be significantly fast as compared to conventional searches, as the multidimensional linked lists and the computing array enable a compact and efficient way of storing data, which can be easily and speedily retrieved when required. More specifically, in the example described, the computing server 102 can search for data (for example, the first value 204, such as rate) used to determine the search result (for example, price) for each row (which already has a second value 304, such as estimates) of the second table 302. Therefore, the task is to search for a first value (for example, rate) 204 compatible with both A9 and P5. This first value (for example, rate) 204 can be determined as described below.

In this example, the computing server 102 can begin the search with first finding A9 and P5 in the computing array 802. A9 in the computing array 802 can point to the linked list 602 for A9, and P5 in the computing array 802 can point to the linked list 702 for P5. If P5 was associated with A9, then the computing server 102 would have started and stopped the search there, and returned the associated first value (for example, rate). However, because P5 is not listed above A9 in a second linked list dimension, the computing server 102 can determine a closest ancestor match for both A9 and P5 by using the linked list 602 and the linked list 702 in order to determine the appropriate first value (for example, rate). The closest ancestor for A9 is {A4, P7}, then {A4, P2}, then {A2, P3}, then {A2, P2}, and then {A1}. The closes ancestor for P5 is {P4}, then {P2, A3}, then {P2, A2}, then {P2, A4}, and then P1. As there is no match for {A9, P5}, the computing server 102 searches for a closest ancestor match in both linked lists 602 and 702. The closest ancestor match for both A9 and P5 is {A4, P2}, which can also be written as {P2, A4}. The first value (for example, rate) for the closest ancestor match {A4, P2} of {A9, P5} (as noted in first row of second table 302) is 0.1. The computing server 102 can multiply this first value (for example, rate) of 0.1 by the second value (for example, estimate) of 10 (as noted in the first row of the second table 302) to determine a price associated with A9 and P5. Accordingly, the price recommended for product P5 and account A9 is 0.1×10=US Dollar 1.00. Similarly, the computing server 102 can calculate the price for each row of the second table 302.

The computing server 102 can send, at 912, the values 124 of the specific data (for example, prices of the accounts and products in each row of the second table 302, wherein each price is computed by multiplying rate 204 and estimate 304) to the computing device 120. The computing device 120 can then store the values 124 and/or output (for example, display on a graphical user interface executed by the computing device 120) those values 124.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, BLUETOOTH® network, infrared network, or other networks.

Although a few variations have been described in detail above, other modifications are possible. For example, the logic flows depicted in the accompanying figures and described herein do not require the particular order shown, or sequential order, to achieve desirable results. Other embodiments may be within the scope of the following claims.

What is claimed is:

1. A computer-implemented method comprising:
retrieving, in response to a database query to retrieve a data value from a database, a plurality of hierarchical data structures from the database, the plurality of hierarchical data structures including a plurality of nodes characterizing data stored within a plurality of tables in the database;
generating, using the plurality of hierarchical data structures, a plurality of linked lists, each linked list in the plurality of linked lists being associated with a corresponding leaf node in the plurality of nodes, and the plurality of linked lists comprising a plurality of multidimensional linked lists having data arranged according to a plurality of dimensions;
generating a computing array storing pointers to locations of each leaf node associated with each linked list in the plurality of linked lists; and
executing the database query by searching the computing array and the plurality of linked lists to obtain a search result, the data value being determined based at least on the search result, wherein at least one of the retrieving, the generating of each linked list, the generating of the computing array, and the searching is performed by one or more programmable processors in a computing server.

2. The computer-implemented method of claim 1, further comprising:
receiving the database query; and
responding to the database query by transmitting the data value determined based at least on the search result.

3. The computer-implemented method of claim 1, wherein the plurality of tables comprises a plurality of first identifiers, a plurality of second identifiers, a plurality of first values, and a plurality of second values.

4. The computer-implemented method of claim 3, wherein: at least one first identifier in the plurality of first identifiers comprises at least one product in a plurality of products;
at least one second identifier in the plurality of second identifiers comprises at least one retailer in a plurality of retailers;
at least one first value in the plurality of first values comprises a rate for at least one product in the plurality of products and for at least one retailer in the plurality of retailers, the rate representing a numerical value generated based on data characterizing historical transactions; and
at least one second value in the plurality of second values comprises an estimate for at least one product in the plurality of products and for at least one retailer in the plurality of retailers, the estimate representing another numerical value generated based on a market analysis.

5. The method of claim 4, wherein the data value is a price that should be charged for each product from each retailer, the price being determined based on the rate and the estimate.

6. The method of claim 3, wherein the plurality of hierarchical data structures comprises:
a first tree comprising the plurality of first identifiers arranged in a first hierarchical order; and
a second tree comprising the plurality of second identifiers arranged in a second hierarchical order.

7. The method of claim 3, wherein the plurality of linked lists comprises a plurality of multidimensional linked lists and wherein each multidimensional linked list has data arranged according to a plurality of dimensions comprising a first dimension associated with the plurality of first identifiers and a second dimension associated with the plurality of second identifiers.

8. The method of claim 3, wherein the plurality of linked lists comprises a first linked list and a second linked list, and wherein the determining of the search result comprises determining a closest ancestor match in the plurality of linked lists, the closest ancestor match characterizing an ancestor node in the first linked list having a first value equal to the first value of another ancestor node in the second linked list, the first value being the search result that is used to calculate the data value.

9. A non-transitory computer program product storing instructions that, when executed by at least one programmable processor, cause the at least one programmable processor to perform operations comprising:
retrieving, in response to a database query to retrieve a data value from a database, a plurality of hierarchical data structures from the database, the plurality of hierarchical data structures including a plurality of nodes characterizing data stored within with a plurality of tables in the database;
generating, using the plurality of hierarchical data structures, a plurality of linked lists, each linked list in the plurality of linked lists being associated with a corresponding leaf node in the plurality of nodes, and the plurality of linked lists comprising a plurality of multidimensional linked lists having data arranged according to a plurality of dimensions;
generating a computing array storing pointers to locations of each leaf node associated with each linked list in the plurality of linked lists; and
executing the database query by searching the computing array and the plurality of linked lists to obtain a search results, the data value being determine based at least on the search result.

10. The non-transitory computer program product of claim 9, further comprising outputting of the data value by displaying the data value on a graphical user interface.

11. A system comprising:
at least one data processor; and
at least one memory storing instructions which, when executed by the at least one data processor, result in operations comprising:
retrieving, in response to a database query to retrieve a data value from a database, a plurality of hierarchical data structures from the database, the plurality of hierarchical data structures including a plurality of nodes characterizing data stored within a plurality of tables in the database;
generating, using the hierarchical data structures, a plurality of linked lists, each linked list in the plurality of linked lists being associated with a corresponding leaf node in the plurality of nodes, and the plurality of linked lists comprising a plurality of multidimensional linked lists having data arranged according to a plurality of dimensions;
generating a computing array storing pointers to locations of each leaf node associated with each linked list in the plurality of linked lists; and
executing the database query by searching the computing array and the plurality of linked lists to obtain a search results, the data value being determined based at least on the search result.

12. The system of claim 11, further comprising a user interface device that executes a graphical user interface, the graphical user interface being configured to display the data value.

13. The system of claim 11, wherein the computing array and the plurality of linked lists are stored in the at least one memory.

14. The system of claim 11, wherein the plurality of hierarchical data structures comprise a plurality of nodes characterizing data within with a plurality of tables, wherein the plurality of tables comprises a first table storing a first portion of a plurality of first identifiers, a first portion of a plurality of second identifiers, and a plurality of first values, and wherein the plurality of tables further comprises a second table storing a second portion of the plurality of first identifiers, a second portion of the plurality of second identifiers, and a plurality of second values.

15. The system of claim 14, wherein:
the first portion of the plurality of first identifiers comprises a first set of one or more products in a plurality of products;
the second portion of the plurality of first identifiers comprises a second set of one or more products in the plurality of products;

the first portion of the plurality of second identifiers comprises a first set of one or more retailers in a plurality of retailers;

the second portion of the plurality of second identifiers comprises a second set of one or more retailers in a plurality of retailers;

at least one first value in the plurality of first values characterizes a rate for at least one product in the first set of one or more products and for at least one retailer in the first set of one or more retailers, the rate representing a numerical value generated based on data characterizing historical transactions; and at least one second value in the plurality of second values characterizes an estimate for at least one product in the second set of one or more products and for at least one retailer in the second set of one or more retailers, the estimate representing another numerical value generated using a market analysis.

16. The system of claim 15, wherein the values of data are a plurality of prices that should be charged for products from corresponding retailers, at least one price in the plurality of prices being a generated by multiplying the rate with the estimate.

17. The system of claim 15, wherein the plurality of hierarchical data structures comprises:

a first hierarchical data structure comprising the plurality of first identifiers arranged in a first hierarchical order; and a second hierarchical data structure comprising the plurality of second identifiers arranged in a second hierarchical order.

18. The system of claim 11, wherein the plurality of linked lists comprises a first linked list and a second linked list, and the determining of the search results comprises determining a closest ancestor match in the plurality of linked lists, the closest ancestor match characterizing an ancestor node in the first linked list having a first value equal to the first value of another ancestor node in the second linked list, the first value being the search result that is used to calculate at least one value of data.

* * * * *